(12) United States Patent
Peterson et al.

(10) Patent No.: US 11,825,164 B2
(45) Date of Patent: Nov. 21, 2023

(54) MEDIA PLAYBACK DEVICE SELECTION

(71) Applicant: Lenovo (Singapore) Pte. Ltd., Singapore (SG)

(72) Inventors: Nathan Peterson, Oxford, NC (US); Gary D Cudak, Wake Forest, NC (US); John M Petersen, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/701,264

(22) Filed: Mar. 22, 2022

(65) Prior Publication Data

US 2023/0308721 A1 Sep. 28, 2023

(51) Int. Cl.
*H04N 21/462* (2011.01)
*H04N 21/472* (2011.01)
*H04N 21/436* (2011.01)

(52) U.S. Cl.
CPC ....... *H04N 21/4621* (2013.01); *H04N 21/436* (2013.01); *H04N 21/472* (2013.01)

(58) Field of Classification Search
CPC . H04N 21/4621; H04N 21/436; H04N 21/472
USPC .......................................................... 709/231
See application file for complete search history.

(56) References Cited

U.S. PATENT DOCUMENTS

| 2012/0272149 A1* | 10/2012 | Lee ........................ H04L 65/612 715/769 |
| 2013/0061141 A1* | 3/2013 | Gibby .................. G11B 19/025 715/704 |
| 2016/0026427 A1* | 1/2016 | Kuper .................... G11B 27/34 700/94 |
| 2018/0088894 A1* | 3/2018 | VanBlon ............... G06F 3/0482 |

\* cited by examiner

*Primary Examiner* — Hermon Asres
(74) *Attorney, Agent, or Firm* — Ference & Associates LLC (57) ABSTRACT

One embodiment provides a method, the method including: receiving, using a media playback optimization system, an indication of media for playback on one of a plurality of devices in operative communication with each other; detecting, using the media playback optimization system, characteristics of the media; identifying, using the media playback optimization system and based upon the characteristics, a playback device from the plurality of devices having capabilities that optimize playback of the media; and providing, using the media playback optimization system, a notification to the user of the playback device.

16 Claims, 3 Drawing Sheets

MEDIA PLAYBACK DEVICE SELECTION

BACKGROUND

Many users have multiple devices that allow for media playback, for example, multiple devices that allow for video or image playback (e.g., televisions, smart televisions, computing devices, gaming devices, etc.), multiple devices that allow for audio playback (e.g., radios, sound systems, audio media players, etc.), and the like. Some devices may provide for both video and audio media playback, for example, a television set usually has an integrated sound output device. Additionally, some of these devices may be combined within a system to make an audio and video playback device, for example, an entertainment system, a gaming system, or the like. Each of the devices may have different capabilities. For example, multiple televisions may each have different resolutions, different attached accessories (e.g., virtual reality devices, surround sound devices, media players, etc.), different physical sizes, and the like. As another example, multiple audio devices may have different sound characteristics, different sound components, and the like.

BRIEF SUMMARY

In summary, one aspect provides a method, the method including: receiving, using a media playback optimization system, an indication of media for playback on one of a plurality of devices in operative communication with each other; detecting, using the media playback optimization system, characteristics of the media; identifying, using the media playback optimization system and based upon the characteristics, a playback device from the plurality of devices having capabilities that optimize playback of the media; and providing, using the media playback optimization system, a notification to the user of the playback device.

Another aspect provides an information handling device, the information handling device including: a plurality of devices; a processor operatively coupled to the plurality of devices; a memory device that stores instructions that, when executed by the processor, causes the information handling device to: receive, using a media playback optimization system, an indication of media for playback on one of the plurality of devices in operative communication with each other; detect, using the media playback optimization system, characteristics of the media; identify, using the media playback optimization system and based upon the characteristics, a playback device from the plurality of devices having capabilities that optimize playback of the media; and provide, using the media playback optimization system, a notification to the user of the playback device.

A further aspect provides a product, the product including: a computer-readable storage device that stores executable code that, when executed by a processor, causes the product to: receive, using a media playback optimization system, an indication of media for playback on one of a plurality of devices in operative communication with each other; detect, using the media playback optimization system, characteristics of the media; identify, using the media playback optimization system and based upon the characteristics, a playback device from the plurality of devices having capabilities that optimize playback of the media; and provide, using the media playback optimization system, a notification to the user of the playback device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While many users have multiple devices that allow for media playback, it can be difficult to remember the capabilities of each device. For example, it can be difficult to remember the resolution of each of multiple televisions or other video output devices. Additionally, each device may have different capabilities that make one device better for playback of media with one characteristic and another device better for playback of media with a different characteristic. In other words, a user does not likely have a single device that could optimize all characteristics of all media playback or that would be the best device for playing all the media. Also, some media may have characteristics where advanced capabilities of the media playback device are not necessary because they are unable to be used with the media. For example, while a 4K television set has a better resolution than a 1080p television set, the resolution does not make a difference if the media is not in 4K resolution.

Traditionally, the solution to viewing media on the "best" device is to have a single device having the latest and most advanced capabilities and use that device for all media playback. However, this is simply not practical in many cases because such a system would likely have many different attached components that take up space that may not be available in certain locations. Additionally, not all components will communicate with or connect to all devices. For example, a new television set may not have a connection point for older sound systems. If the older sound system is the only sound system that the user has, the user will be unable to "upgrade" the new television set with the sound system that provides better audio output as compared to the speakers integral to the television set.

Additionally, the user has to remember which device has which capabilities. For example, the user would have to remember the resolution of each of the television sets. Since television sets generally last for multiple years, it can be difficult to remember the resolution across the multiple years, especially if the user has multiple television sets having different resolutions. While there may be applications that can detect capabilities of devices, these applications do not tell the user the capabilities. Rather, the application utilizes this information to properly display or playback media on the device.

Accordingly, the described system and method provides a technique for selecting a media playback device from a plurality of media playback devices that optimizes the media playback experience based upon characteristics of the media and capabilities of each of the media playback devices. The media playback optimization system receives an indication of media for playback on one of a plurality of interconnected devices. The devices may be directly connected to each other, may communicate to a common component or system, and/or a combination thereof. The indication for media playback may include an indication that media is being played on one of the devices, for example, the user has turned on a device and media playback started. Alternatively, the indication for media playback may include an indication that the user would like to start playing media on a device, for example, the user has indicated media is to be transferred to a device from another device, the user has selected new media on the device to be played, or the like.

The system detects characteristics of the media, for example, media resolution, media image characteristics, audio sound characteristics, media type, metadata of the media, and/or the like. Based upon the media characteristics and the capabilities of each of the devices, the system determines which of the devices would optimize the playback of the media. In other words, the system determines which of the devices of the plurality of devices would provide the best playback experience based upon both the characteristics of the media and the capabilities of the devices. Once one or more playback devices that optimize the media playback experience are determined, the system provides a notification to a user of the playback device. The notification identifies which of the devices may provide the best media playback experience for the selected media.

Therefore, a system provides a technical improvement over traditional methods for media playback by providing a system that can not only identify capabilities of media playback devices and characteristics of media to be played, but can also notify the user of a device that can provide the best media playback experience. Thus, instead of relying on a user to remember the capabilities of each device, the described system identifies the capabilities and then provides a notification to the user of the device having the best capabilities for the media to be played. Additionally, the user does not have to know the characteristics of the media in order to select the best device for playback, whereas conventional systems would rely on the user to identify the media characteristics. Since the described system is able to identify capabilities of a plurality of devices that are available for media playback, the system can determine which of the devices could optimize the playback experience even if some devices have better capabilities in one media playback area and other devices have better capabilities in other media playback area. Accordingly, the described media playback optimization system provides a better user experience for media playback than conventional devices.

The illustrated example embodiments will be best understood by reference to the figures. The following description is intended only by way of example, and simply illustrates certain example embodiments.

Figure 1:
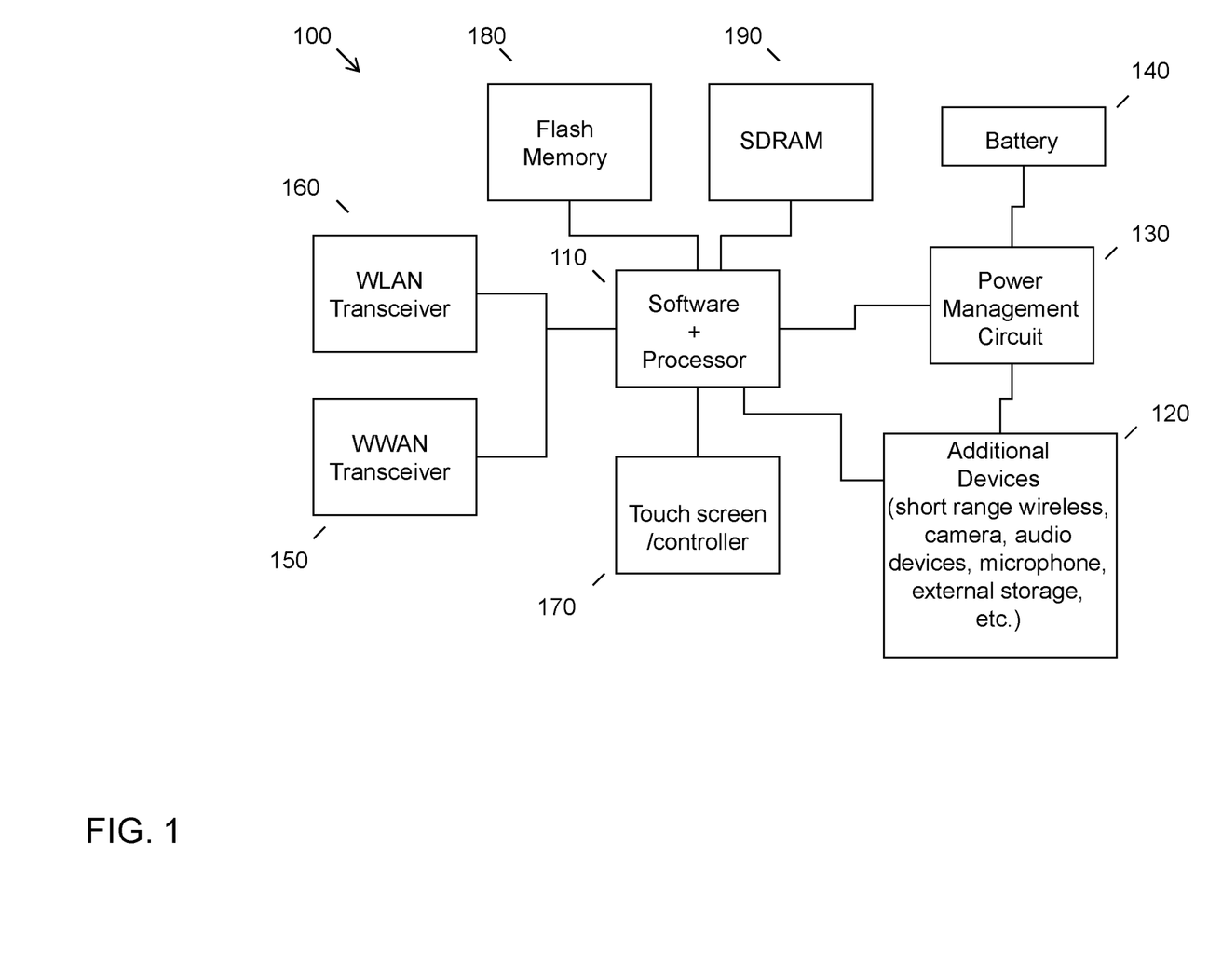
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
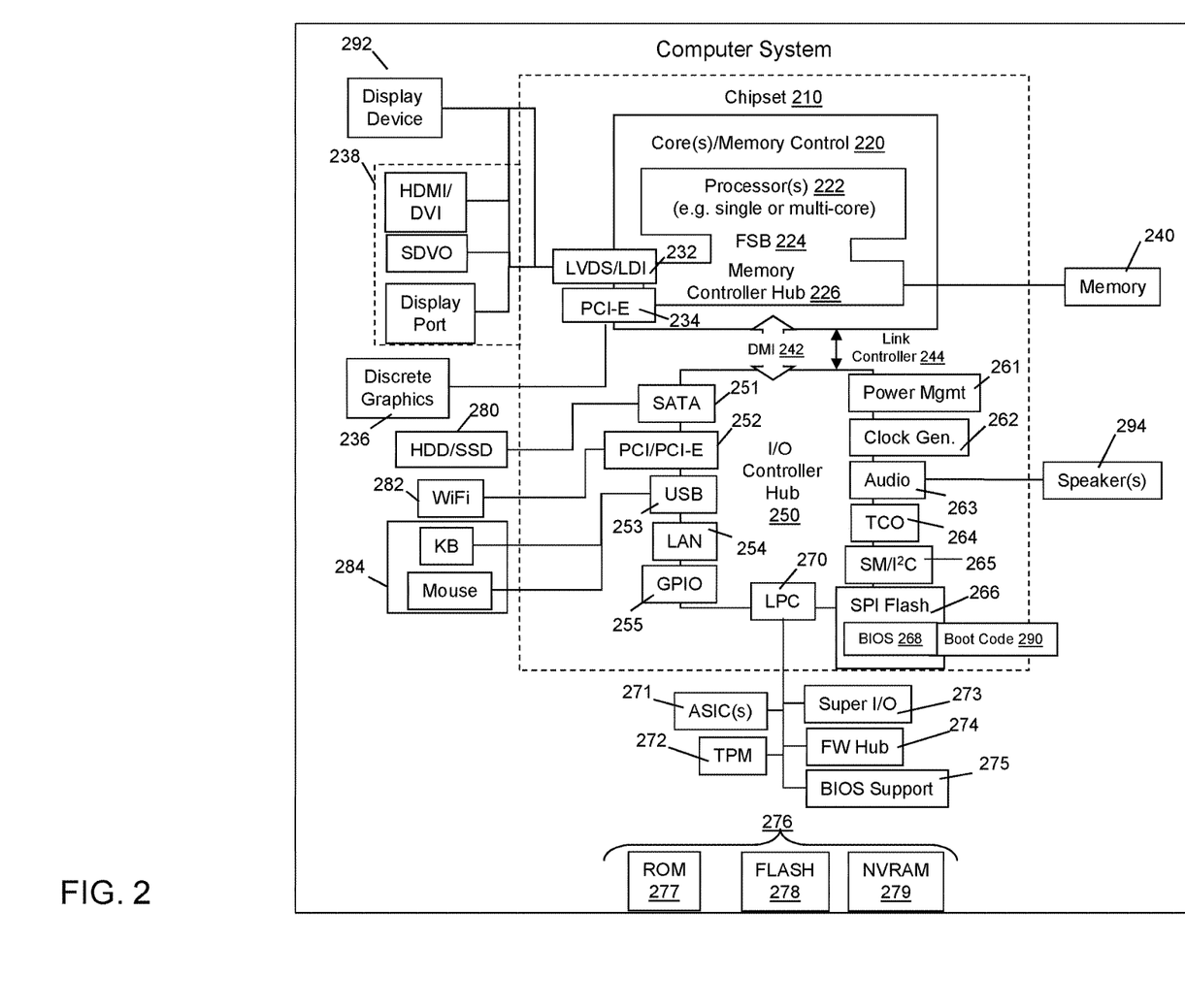
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for selecting a device from a plurality of devices for media playback. For example, the circuitry outlined in FIG. 1 may be implemented in a tablet or smart phone embodiment, whereas the circuitry outlined in FIG. 2 may be implemented in a personal computer embodiment.

Figure 3:
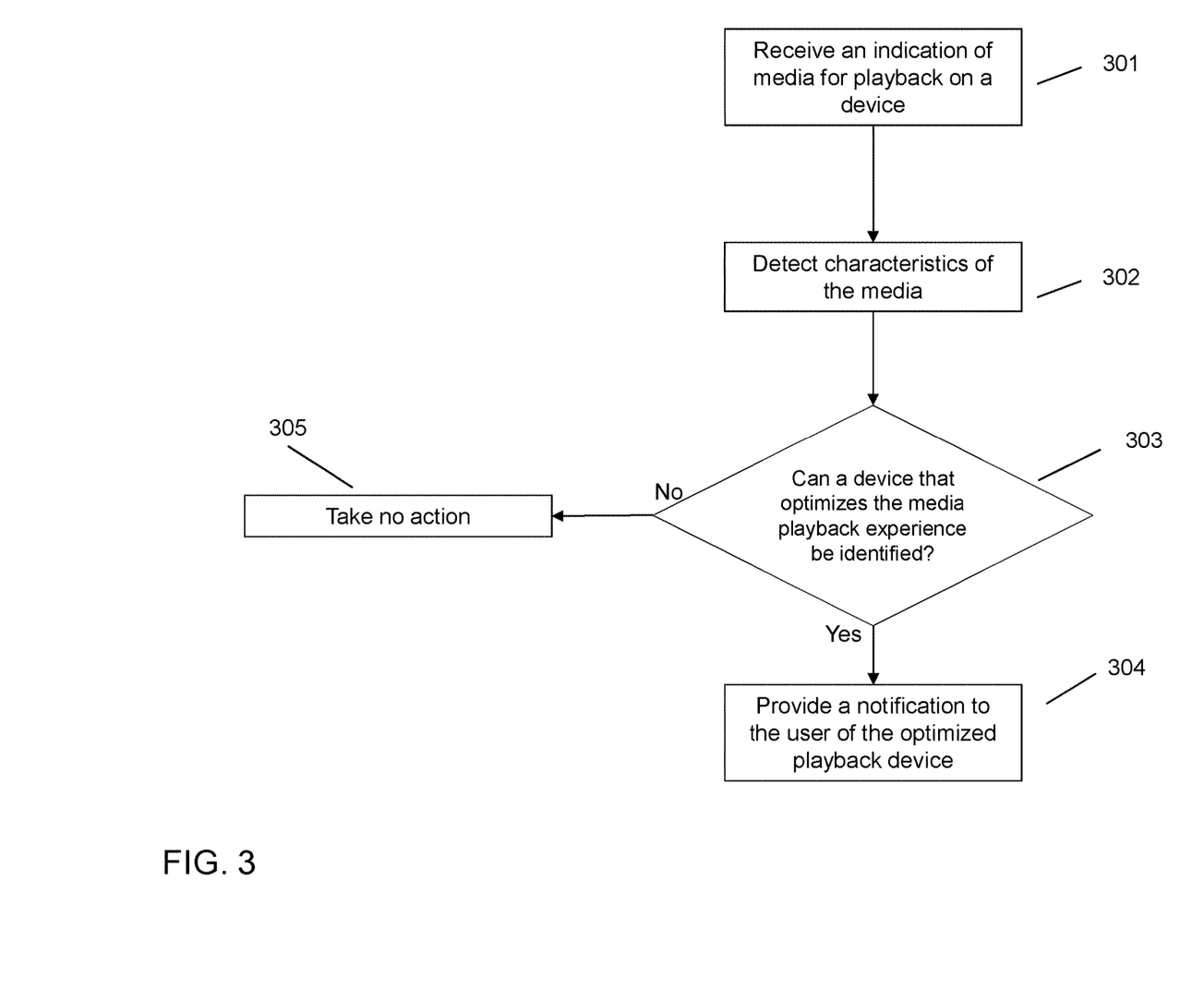
FIG. 3 illustrates an example method for selecting a media playback device from a plurality of media playback devices that optimizes the media playback experience based upon characteristics of the media and capabilities of each of the media playback devices.

FIG. 3 illustrates an example method for selecting a media playback device from a plurality of media playback devices that optimizes the media playback experience based upon characteristics of the media and capabilities of each of the media playback devices. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to select a device from a plurality of devices that optimizes a media playback experience. Additionally, the media playback optimization system includes modules and features that are unique to the described system.

At 301, the media playback optimization system receives an indication of media for playback on one of a plurality of devices in operative communication with each other. A user may have many media playback devices (e.g., video or image playback devices, audio playback devices, etc.) within an environment, for example, a home, business, or the like. Each of the media playback devices may have different capabilities as compared other of the devices. Capabilities of a device identify the characteristics of the device and components that are attached to or utilized by the device. Thus, capabilities of devices may include characteristics of the device (e.g., resolution of a display screen, sound characteristics, technology integral to the device (e.g., OLED screen, bass/treble control, Internet or application access by the device, etc.), a display type (e.g., projector, display screen, etc.), screen size, etc.) and accessories or components attached to or able to be utilized by the device (e.g., surround sound components, 3D technology, virtual or augmented reality technology, media input devices, etc.). The capabilities can be identified by the device itself, identified by the system, and/or the like.

The multiple devices are in operative communication with each other, meaning that they are interconnected in some way, either directly or indirectly. Devices may be directly connected to each other, allowing direct communication between the devices. Devices may be connected to a single source (e.g., network, router, Internet, streaming service, single account, cloud service, etc.), that allow communication to the single source, while not necessarily providing communication directly between the devices themselves. The devices may also have a combination of both direct connection and indirect connection, with some devices able to communicate directly with other and also able to communicate with the single source, and other of the devices connected only to the single source, thereby providing an indirect connection between the devices. The media playback optimization system may be located or installed on each of the devices, may be located or installed on the single device, may be located or installed on a separate system or component that can communicate with each of the devices and/or the single source, or a combination thereof. The media playback optimization system may also be a part of an application that is accessible by the device. For example, the media playback optimization system may be offered as part of a streaming service or from a media provider.

The indication of media for playback may be a user powering on a device and media then playing on the device. For example, the user may power on a television and once the media signal from the television company is received, the media starts playing on the television. The example that will be referred here throughout is a television or other device for video media playback. However, it should be understood that similar techniques can be employed for audio media playback with audio playback devices and this disclosure is not intended to limit the scope to only video media playback and video media playback devices.

Another type of indication of media for playback is a user selecting media from a device to replace media already being played on a device. For example, the user may select a different television program from a guide menu, a previously recorded program, media from an input device (e.g., gaming device, DVD player, portable device, etc.), media from a streaming service, application, remote data storage location, etc., and the like. A final example type of indication of media for playback is a user utilizing an application on another device (e.g., smart phone, smart watch, tablet, computing system, etc.) to select media and then indicating the media should be played on one of the plurality of devices. For example, the user may use a smart phone to select media accessible by the smart phone and then provide an indication that the media should be cast or mirrored to a television. These are merely examples of indications for media playback and are not intended to be limiting. Thus, the indication of media for playback may be any action taken by a user that identifies media for playback on a device.

At 302, the media playback optimization system detects characteristics of the media. Characteristics of the media identifies information about the media useful for correct or optimized playback of the media. Thus, examples of media characteristics include, but are not limited to, captured resolution, color use (e.g., lots of white color levels, lots of black or dark color levels, black and white vs. color, color spectrum, color vibrancy, etc.), sound attributes (e.g., bass levels, treble levels, sound type or genre, etc.), special effects (e.g., 3D, virtual reality, augmented reality, strobe lighting, etc.), and the like. To detect the characteristics the system may access metadata of the media. The metadata may detail the media characteristics.

Another technique to detect the media characteristics is based upon historical or learned information. As media is played, the system can monitor the media and identify characteristics using image analysis, audio analysis, and/or other analysis techniques. As media characteristics are monitored and learned, the system can store these characteristics with the media. When the media, or similar media, is played the system can used the stored media characteristics. Since the system may be able to communicate with a broader communication network, for example, through a cloud service or the Internet, the historical or learned information may include information learned by other media playback optimization systems in other households or entities. In other words, the historical or learned information can be based upon crowd-sourced information. As one user plays the media, their system can monitor the media, learn characteristics, and share those characteristics with other media playback optimization systems either directly or by storing the characteristics in a data storage location accessible by other media playback optimization systems. Other techniques for detecting media characteristics are possible and contemplated. For example, a user may manually input media characteristics. As another example, the system may query a secondary source (e.g., Internet, data storage location, media producer, etc.) for media characteristics.

At 303, the media playback optimization system determines whether a device the optimizes the media playback experience can be identified. In other words, the media playback optimization system, based upon the media characteristics, attempts to identify a playback device from the plurality of devices that has capabilities that optimize playback of the media at 303. The media characteristics are utilized to determine what device capabilities would be best for the playback of the media. For example, if the media has a lot of dark or black colors, certain TV technology, for example, OLED displays, display richer, deeper, or truer black colors than other TV technology, for example, a regular LED display. Thus, identifying the playback device is based upon the media characteristics and the capabilities of each of the devices that the media could be played back on.

The system is attempting to determine which of the devices has capabilities that would result in the best media playback experience. Thus, the system attempts to match the media characteristics to capabilities that support the media characteristics. As an example, if a characteristic of the media is 4K resolution, the system would identify a device having 4K or better resolution, if there is a device in the system of interconnected media playback devices. As another example, if a characteristic of the media is ranging sound dynamics, the system would identify a device that could support the ranging sound dynamics. In identifying the device, the system may perform a simple matching of characteristics to capabilities. However, some characteristics may be more complex than simply matching to a particular capability. For example, color spectrums and audio spectrums may be more complex than simply identifying if a screen resolution matches. In this case, the system may perform a more complex analysis of characteristic to capability.

Since not all devices have the same capabilities and it is likely that a single device does not have the "best" capabilities of all the devices, the system may determine that not a single device can fulfill or optimize all the media characteristics. In this case, the system could identify which of the devices could fulfill the most characteristics as compared to the other devices. The system may then identify this as the playback device, or the device that would optimize the media playback experience. For example, the system may determine that at least one other device has more capabilities corresponding to the characteristics than a device currently being used to play the media. However, certain characteristics or capabilities may be more important than others to a user. For example, the user may want the best picture quality, but may not be as concerned about the sound quality. In this case, the system could weight each of the characteristics/capabilities based upon the preferences of the user. This could result in the system identifying a playback device that does not fulfill the most characteristics, but instead fulfills the most important characteristics for the user.

The system may also determine that more than one device could fulfill or optimize all the media characteristics or the same number of media characteristics, even if those may be different characteristics. In this case, the system may rank the devices based upon some criteria. One technique for ranking the devices may be based upon an estimated playback experience of the media on each of the devices. For example, while the media may have special effects and one of the devices can support the special effects, the system may determine that the special effects are only used for a few seconds throughout the entirety of the media. If the device cannot support other characteristics as well as other devices, the system may rank this device lower than other devices because the characteristic is such a small fraction of the overall media playback experience. The estimated playback experience may also be based upon user-provided input, for example, preferred characteristics, preferred devices, and the like. Ranking the devices may also be based upon a number of characteristics that can be fulfilled or optimized, an effort of the user for utilizing the device (e.g., the user has to move to a completely different room for a media playback of a few minutes, the user has to connect certain components, etc.), the characteristics of the media, a combination of ranking techniques, and/or the like.

The system may also identify other attributes of the devices when identifying a playback device. One attribute may be a use of one or more devices. The system may also identify a current use of one or more of the devices in identifying the playback device. If one of the devices is currently in use, the system may rank that device lower than other devices that could fulfill the same characteristics/capabilities or other devices that would normally be ranked similarly to that device. Another attribute may be a preference of the user for one device over another device. The user may indicate that one or more devices are preferred over other of the devices, for example, by indicating a default device, by ranking the devices, by indicating a default location, and/or the like.

If the media playback optimization system cannot identify a playback device or device that optimizes the media playback experience at 303, the system may take no action at 305. The system may also notify the user that a device could not be identified. This may occur when, for example, the media characteristics cannot be identified, communication between the devices cannot be obtained, all other devices are in use, and/or the like.

If, on the other hand, the system can identify a playback device at 303, the system provides a notification to the user of the playback device at 304. The notification may be a simple notification that indicates a particular device of the plurality of devices would provide a better media playback experience than the device currently playing the media. The notification may also display a listing of devices that could be used to play the media. In this listing, the system can provide an estimated playback experience of the media. For example, the system may provide a listing and then highlight the devices with a particular color, with each color signifying an estimated playback experience. As an example, a green device may indicate an estimated playback experience above a particular "great" threshold, a yellow device may indicate an estimated playback experience above a particular "good" threshold, but not to the level of the "great" threshold, and a red device may indicate an estimated playback experience below the "good" threshold. The notification may also rank the devices in a listing, with the top device being the highest ranked device and the bottom device being the lowest ranked device.

In providing the notification, the system can detail why a particular device was selected as the playback device, for example, detailing the characteristics that are optimized on the playback device, identifying that different device that would provide the same level of media playback experience or a better level of media playback experience is currently in use, identifying that one device has been indicated as a preferred device, and/or the like. Thus, the notification may be unique to the user providing the indication of media for playback. Whether a notification is provided or not may also be based upon the user. For example, some users may not be concerned with whether the media would be displayed better or sound better on a different device. As another example, some users may not be allowed to view media on other devices. Thus, these users may not want a notification.

In the event that the user is attempting to cast or transfer media from one device to another, the notification can be provided before the user casts the media onto a device. In this case, when the user identifies the media to be cast, the system may perform the media optimization analysis and then display a listing, ranking, or other notification of which device the user should cast the media to. In the case of audio devices without display screens, the notification may be displayed or provided on another device, for example, a portable device of the user (e.g., smart phone, tablet, smart watch, etc.), a device having a display that is connected to and within viewable proximity of the audio device (e.g., a television, computing system, etc.), an audible notification provided using a digital assistant and/or digital assistant device, or the like.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   receiving, using a media playback optimization system, an indication of media for playback on one of a plurality of devices in operative communication with each other;
   detecting, using the media playback optimization system, characteristics of the media, the characteristics being related to playback of the media;
   identifying, using the media playback optimization system and based upon the characteristics, a playback device from the plurality of devices having capabilities that optimize playback of the media, wherein the identifying comprises determining, based upon analyzing the characteristics against capabilities of the plurality of devices that support the characteristics, at least one device of the plurality of devices having the capabilities supporting the characteristics, wherein the identifying the comprises identifying a device of the plurality of devices having the most capabilities corresponding to an optimization of the characteristics as compared to others of the plurality of devices, wherein the identifying the playback device comprises ranking the plurality of devices based upon an estimated playback experience of the media on each of the plurality of devices; and
   providing, using the media playback optimization system, a notification to the user of the playback device.

2. The method of claim 1, wherein the indication of media to be played comprises media playing on one of the plurality of devices.

3. The method of claim 2, wherein the identifying comprises determining that at least one device other than the one of the plurality of devices has more capabilities corresponding to the characteristics of the media than the one of the plurality of devices currently playing the media.

4. The method of claim 1, wherein the indication of media to be played comprises receipt of a user input selecting media for playing on one of the plurality of devices.

5. The method of claim 4, wherein the providing a notification comprises displaying a listing of devices from the plurality of devices and an estimated playback experience of the media for each of the devices in the listing before playing the media on the one of the plurality of devices.

6. The method of claim 1, wherein the detecting characteristics comprises accessing metadata corresponding to the media.

7. The method of claim 1, wherein the providing a notification comprises providing a notification unique to a user providing the indication of media for playback.

8. The method of claim 1, wherein the plurality of devices comprise at least one device selected from the group consisting of: a video playback device and an audio playback device.

9. An information handling device, the information handling device comprising:
   a plurality of devices;
   a processor operatively coupled to the plurality of devices;
   a memory device that stores instructions that, when executed by the processor, causes the information handling device to:
   receive, using a media playback optimization system, an indication of media for playback on one of the plurality of devices in operative communication with each other;
   detect, using the media playback optimization system, characteristics of the media, the characteristics being related to playback of the media;
   identify, using the media playback optimization system and based upon the characteristics, a playback device from the plurality of devices having capabilities that optimize playback of the media, wherein the identifying comprises determining, based upon analyzing the characteristics against capabilities of the plurality of devices that support the characteristics, at least one device of the plurality of devices having the capabilities supporting the characteristics, wherein the identifying the comprises identifying a device of the plurality of devices having the most capabilities corresponding to an optimization of the characteristics as compared to others of the plurality of devices, wherein the identifying the playback device comprises ranking the plurality of devices based upon an estimated playback experience of the media on each of the plurality of devices; and
   provide, using the media playback optimization system, a notification to the user of the playback device.

10. The information handling device of claim 9, wherein the indication of media to be played comprises media playing on one of the plurality of devices.

11. The information handling device of claim 10, wherein the identifying comprises determining that at least one device other than the one of the plurality of devices has more capabilities corresponding to the characteristics of the media than the one of the plurality of devices currently playing the media.

12. The information handling device of claim 9, wherein the indication of media to be played comprises receipt of a user input selecting media for playing on one of the plurality of devices.

13. The information handling device of claim 12, wherein the providing a notification comprises displaying a listing of devices from the plurality of devices and an estimated playback experience of the media for each of the devices in the listing before playing the media on the one of the plurality of devices.

14. The information handling device of claim 9, wherein the detecting characteristics comprises accessing metadata corresponding to the media.

15. The information handling device of claim 9, wherein the providing a notification comprises providing a notification unique to a user providing the indication of media for playback.

16. A product, the product comprising:
a computer-readable storage device that stores executable code that, when executed by a processor, causes the product to:
receive, using a media playback optimization system, an indication of media for playback on one of a plurality of devices in operative communication with each other;
detect, using the media playback optimization system, characteristics of the media, the characteristics being related to playback of the media;
identify, using the media playback optimization system and based upon the characteristics, a playback device from the plurality of devices having capabilities that optimize playback of the media, wherein the identifying comprises determining, based upon analyzing the characteristics against capabilities of the plurality of devices that support the characteristics, at least one device of the plurality of devices having the capabilities supporting the characteristics, wherein the identifying the comprises identifying a device of the plurality of devices having the most capabilities corresponding to an optimization of the characteristics as compared to others of the plurality of devices, wherein the identifying the playback device comprises ranking the plurality of devices based upon an estimated playback experience of the media on each of the plurality of devices; and
provide, using the media playback optimization system, a notification to the user of the playback device.

* * * * *